(12) United States Patent
Zimmerle et al.

(10) Patent No.: US 11,035,799 B2
(45) Date of Patent: Jun. 15, 2021

(54) CALIBRATION METHOD FOR REAGENT CARD ANALYZERS

(71) Applicants: Chris Thomas Zimmerle, Goshen, IN (US); Amy Zercher, Nappanee, IN (US); Jennifer Ann Goldsburg, Vandalia, MI (US)

(72) Inventors: Chris Thomas Zimmerle, Goshen, IN (US); Amy Zercher, Nappanee, IN (US); Jennifer Ann Goldsburg, Vandalia, MI (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 1159 days.

(21) Appl. No.: 14/383,160

(22) PCT Filed: Mar. 7, 2013

(86) PCT No.: PCT/US2013/029569
§ 371 (c)(1),
(2) Date: Sep. 5, 2014

(87) PCT Pub. No.: WO2013/134491
PCT Pub. Date: Sep. 12, 2013

(65) Prior Publication Data
US 2015/0031135 A1    Jan. 29, 2015

Related U.S. Application Data

(60) Provisional application No. 61/608,922, filed on Mar. 9, 2012.

(51) Int. Cl.
*G01N 21/78* (2006.01)
*G01N 35/00* (2006.01)
(Continued)

(52) U.S. Cl.
CPC ........... *G01N 21/78* (2013.01); *G01N 21/274* (2013.01); *G01N 35/00* (2013.01); *G01N 21/253* (2013.01);
(Continued)

(58) Field of Classification Search
CPC .. G01N 35/00; G01N 21/274; G01N 21/8483; G01N 35/00693; G01N 21/78; G01N 21/25; Y10T 436/10
See application file for complete search history.

(56) References Cited

U.S. PATENT DOCUMENTS 3,123,443 A    3/1964 Smeby
3,212,855 A    10/1965 Mast et al.
(Continued)

FOREIGN PATENT DOCUMENTS

CN    1649643 A    8/2005
CN    1912585 A    2/2007
(Continued)

OTHER PUBLICATIONS

European Search Report and Written Opinion of European Application No. 17198527.8 dated Jan. 4, 2018.
(Continued)

*Primary Examiner* — Rebecca M Fritchman
(74) *Attorney, Agent, or Firm* — Dunlap Codding P.C.

(57) ABSTRACT

A method for calibrating an imager of a reagent analyzer, comprises positioning a dry reagent pad at a first read position in a field of view of the imager, the first read position illuminated by an illumination source with a first intensity, detecting a reference optical signal by the imager, indicative of a first reflectance value of the dry reagent pad at the first read position, positioning the dry reagent pad at a second read position, the second read position illuminated with a second intensity different from the first intensity, (Continued)

detecting a first optical signal by the imager, indicative of a second reflectance value of the dry reagent pad at the second read position, and calculating, by a processor, a calibration factor for the dry reagent pad at the second read position based on a difference between the reference optical signal and the first optical signal.

18 Claims, 5 Drawing Sheets

(51) Int. Cl.
    *G01N 21/27*    (2006.01)
    *G01N 21/00*    (2006.01)
    *G01N 21/84*    (2006.01)
    *G01N 21/25*    (2006.01)

(52) U.S. Cl.
    CPC ... *G01N 21/8483* (2013.01); *G01N 35/00693* (2013.01); *G01N 2035/00148* (2013.01); *Y10T 436/10* (2015.01)

(56) References Cited

U.S. PATENT DOCUMENTS

| | | |
|---|---|---|
| 3,814,668 A | 6/1974 | Blake et al. |
| 4,526,753 A * | 7/1985 | Boger .................. G01N 33/523 422/420 |
| 5,854,684 A | 12/1998 | Stabile et al. |
| 2006/0127946 A1 | 6/2006 | Montagu et al. |
| 2008/0240558 A1 | 10/2008 | Li et al. |
| 2009/0116026 A1 | 5/2009 | Imura |
| 2010/0239137 A1* | 9/2010 | Pugia .................. G01N 21/274 382/128 |
| 2011/0223673 A1* | 9/2011 | Profitt .................. G01N 21/21 436/8 |
| 2013/0157372 A1 | 6/2013 | Galano et al. |

FOREIGN PATENT DOCUMENTS

| | | |
|---|---|---|
| EP | 1484601 A2 | 12/2004 |
| JP | 2002525625 A | 8/2002 |
| JP | 2007232472 A | 9/2007 |
| JP | 2009115604 A | 5/2009 |
| WO | 2011012848 A1 | 2/2011 |
| WO | 2013090655 A1 | 6/2013 |

OTHER PUBLICATIONS

European Search Report and Opinion of European Application No. EP 13757054 dated Nov. 30, 2015.

International Search Report and Written Opinion of International Application No. PCT/US2013/029569 dated May 23, 2013.

* cited by examiner

CALIBRATION METHOD FOR REAGENT CARD ANALYZERS

INCORPORATION BY REFERENCE

The entirety of U.S. Provisional Application Ser. No. 61/608,922, filed on Mar. 9, 2012, is hereby expressly incorporated herein by reference.

BACKGROUND

The inventive concepts disclosed herein generally relate to analyzers for reagent cards, and more particularly, but not by way of limitation, to a method for calibrating multiple-profile reagent card analyzers by using a dry reagent pad.

To satisfy the needs of the medical profession as well as other expanding technologies, such as the brewing industry, chemical manufacturing, etc., a myriad of analytical procedures, compositions, and tools have been developed, including the so-called "dip-and-read" type reagent test devices. Regardless of whether dip-and-read test devices are used for the analysis of a biological fluid or tissue, or for the analysis of a commercial or industrial fluid or substance, the general procedure involves a test device coming in contact with the sample or specimen to be tested, and manually or instrumentally analyzing the test device.

Dip-and-read reagent test devices enjoy wide use in many analytical applications, especially in the chemical analysis of biological fluids, because of their relatively low cost, ease of usability, and speed in obtaining results. In medicine, for example, numerous physiological functions can be monitored merely by dipping a dip-and-read reagent test device into a sample of body fluid or tissue, such as urine or blood, and observing a detectable response, such as a change in color or a change in the amount of light reflected from, or absorbed by the test device.

Many of the dip-and-read reagent test devices for detecting body fluid components are capable of making quantitative, or at least semi-quantitative, measurements. Thus, by measuring the detectable response after a predetermined time, a user can obtain not only a positive indication of the presence of a particular constituent in a test sample, but also an estimate of how much of the constituent is present. Such dip-and-read reagent test devices provide physicians and laboratory technicians with a facile diagnostic tool, as well as with the ability to gauge the extent of disease or bodily malfunction.

Illustrative of dip-and-read reagent test devices currently in use are products available from Siemens Healthcare Diagnostics Inc., under the trademark MULTISTIX, and others. Immunochemical, diagnostic, or serological test devices, such as these usually include one or more carrier matrix, such as absorbent paper, having incorporated therein a particular reagent or reactant system which manifests a detectable response (e.g., a color change) in the presence of a specific test sample component or constituent. Depending on the reactant system incorporated with a particular matrix, these test devices can detect the presence of glucose, ketone bodies, bilirubin, urobilinogen, occult blood, nitrite, and other substances. A specific change in the intensity of color observed within a specific time range after contacting the dip-and-read reagent test device with a sample is indicative of the presence of a particular constituent and/or its concentration in the sample. Some other examples of dip-and-read reagent test devices and their reagent systems may be found in U.S. Pat. Nos. 3,123,443, 3,212,855, and 3,814,668, the entire disclosures of which are hereby incorporated herein by reference.

However, dip-and-read reagent test devices suffer from some limitations. For example, dip-and-read reagent test devices typically require a technician to manually dip the test device into a sample, wait for a prescribed amount of time, and visually compare the color of the test device to a color chart provided with the test device. This process is slow and the resulting reading is highly skill-dependent (e.g., exact timing, appropriate comparison to the color chart, ambient lighting conditions, and technician vision) and may be inconsistent between two different technicians performing the same test. Finally, the act of manually dipping the test device into the sample may introduce cross-contamination or improper deposition of the test sample on the test device, such as via incomplete insertion of the test device into the sample, insufficient time for the sample to be deposited onto the test device, or having too much sample on the test device which may drip, leak, or splash on the technician's work area, person, or clothing.

Testing tools and methods have been sought in the art for economically and rapidly conducting multiple tests, especially via using automated processing. Automated analyzer systems have an advantage over manual testing with respect to cost per test, test handling volumes, and/or speed of obtaining test results or other information.

Automated instruments which are currently available for instrumentally reading individual dip-and-read reagent test devices, or reagent strips, (e.g., CLINITEK STATUS reflectance photometer, manufactured and sold by Siemens Healthcare Diagnostics, Inc.) require each dip-and-read reagent test device to be manually loaded into the automated instrument after contacting the test device with specimen or sample to be tested. Manual loading requires that the reagent test device be properly positioned in the automated instrument within a limited period of time after contacting the solution or substance to be tested. At the end of the analysis, used test devices are removed from the instrument and disposed of in accordance with applicable laws and regulations.

Another recent development is the introduction of multiple-profile reagent cards and multiple-profile reagent card automated analyzers. Multiple-profile reagent cards are essentially card-shaped test devices which include multiple reagent-impregnated matrices or pads for simultaneously or sequentially performing multiple analyses of analytes, such as the one described in U.S. Pat. No. 4,526,753, for example, the entire disclosure of which is hereby incorporated herein by reference. The reagent pads on the multiple-profile reagent card are typically arranged in a grid-like arrangement and spaced at a distance from one another so as to define several rows and columns of reagent pads. Adjacent reagent pads in the same row may be referred to as a test strip, and may include reagents for a preset combination of tests that is ran for each sample, for example.

Multiple-profile reagent cards result in an efficient, economical, rapid, and convenient way of performing automated analyses. An automated analyzer configured to use multiple-profile reagent cards typically takes a multiple-profile reagent card, such as from a storage drawer, or a cassette, and advances the multiple-profile reagent card through the analyzer over a travelling surface via a card moving mechanism, typically one step at a time so that one test strip (or one row of reagent pads) are positioned at a sample-dispensing position and/or at one or more read position. Exemplary card moving mechanisms include a conveyor belt, a ratchet mechanism, a sliding ramp, or a card-gripping or pulling mechanism. As the multiple-profile reagent card is moved or travels along the travelling surface and is positioned at the sample-dispensing position, one or more pipettes (e.g., manual or automatic) deposits a volume of one or more samples on one or more of the reagent pads on the reagent card. Next, the reagent pads are positioned at one or more read positions and analyzed (e.g., manually or automatically) to gauge the test result. The reagent card is placed in the field of view of an imaging system, such as an optical imaging system, a microscope, or a photo spectrometer, for example, and one or more images of the reagent pads on the card (e.g., optical signals indicative of the color of the reagent pads) is captured and analyzed. Typically, the field of view of the imaging system is relatively large to allow for the capture of multiple images of the same reagent pad as the reagent card is moved or stepped across multiple read positions in the field of view of the imaging system. The field of view encompasses multiple read positions or locations, and each reagent pad is moved in a stepwise fashion through the read positions as the reagent card travels across the field of view of the imaging system. Because the analyzer moves the card between various read positions in known intervals of time, the multiple images taken in the field of view of the imaging system allow the analyzer to determine changes in the color of the reagent pad as a result of the reagent pad reacting with the sample at each read position as a function of the time it takes the pad to be moved to the respective read position, for example. Finally, the used card is removed from the analyzer, and is disposed of appropriately.

An existing problem with optical imaging systems that are used with automated analyzers is the uneven illumination of the relatively large field of view of the optical imaging system. The uneven illumination also may result in inaccurate color measurements at different read positions, and may introduce errors unique to a particular instrument and/or to a particular reagent card lot. For example, as each row of reagent pads (or test strip) of the reagent card is advanced across the field of view of the imaging system, the illumination intensity at each read position may vary, with some read positions having higher-intensity illumination and some read positions having lower-intensity illumination. Such variance in illumination intensity between read positions across the field of view of the imaging system may be called "positional variation", and multiple unsuccessful attempts have been made to address this error source in the prior art.

For example, some prior art attempts to calibrate this positional variation across the field of view of the optical imaging systems rely on internal calibration chips, which are devices positioned in the field of view of the imaging system to act as a color standard. However, it is difficult to position such calibration chips at each read location across the field of view, and further, such calibration chips often do not have the same color or reflectance properties as the reagent pads that will ultimately be read at each read position. Further it is difficult to automate a large calibration chip in such a way that this process can be easily done.

A further attempt to calibrate for positional variation includes running measurements of a known standardized calibration bar between the running of each test strip or reagent card to correct for instrument-to-instrument variation and for positional variation within an analyzer. However, this is time-consuming and cumbersome, and results in increased downtime for the analyzer.

Finally, another attempt to calibrate for positional variation is to advance a color standard card across the field of view, which color standard card typically has no reagent pads positioned thereon. However, the inventors have discovered that due to the three-dimensional structure of the reagent pads such color standard cards are not suitable analogs for the reagent pads, and result in relatively large margins of error. Further, such color standard cards tend to be expensive and hard to reproduce.

Other sources of error for automated analyzers include variation of the illumination intensity between instruments, and variation between negative reagents from different reagent lots, which may further reduce the accuracy of the color measurement at the same read position between instruments and reagent lots. The prior art has not optimally addressed such additional sources of error. For example, attempts to calibrate for the instrument-to-instrument and lot-to-lot variation of automated analyzers include wet negative reagent calibration, which involves applying a known negative control solution to one or more pads of a reagent card at the initial read position to calibrate for the variation between instruments and reagent lots. However, such wet calibration methods include expensive negative reagents, waste reagents on a card, and/or wastes reagent cards, and are time-consuming, which results in downtime for the automated analyzers and increased expense for operators.

Accordingly, a need exists in the art for a method for calibrating for the positional variation of reagent analyzers such as automatic analyzers, without using wet negative reagent calibration, calibration chips, or calibration cards. A further need exists for a method for calibrating for instrument and reagent lot-to-lot differences. It is to such methods and to reagent analyzers using such methods that the inventive concepts disclosed herein are directed.

SUMMARY

In one aspect, the inventive concepts disclosed herein are directed to an automated method for calibrating an imager of a reagent analyzer, comprising: (a) positioning a dry reagent pad at a first read position in a field of view of the imager, the first read position illuminated by an illumination source with a first intensity; (b) detecting a reference optical signal by the imager, the reference optical signal indicative of a first reflectance value of the dry reagent pad at the first read position; (c) positioning the dry reagent pad at a second read position in the field of view of the imager, the second read position illuminated with a second intensity different from the first intensity; (d) detecting a first optical signal by the imager, the first optical signal indicative of a second reflectance value of the dry reagent pad at the second read position; and (e) calculating, by a processor executing processor executable code, a calibration factor for the dry reagent pad at the second read position based on a difference between the reference optical signal and the first optical signal. The calibration factor for the dry reagent pad at the second read position may be calculated based on a ratio of the reference optical signal to the first optical signal.

The method may further comprise designating the calibration factor as 1 for the first read position. In some embodiments, the method further comprises storing the calibration factor for the dry reagent pad at the second read position in a non-transitory computer readable medium, while in some embodiments the calibration factor is stored in the non-transitory computer readable medium as a component of a data table storing multiple sets of calibration factors, with each set for a particular read position. Further, the reference optical signal may include a red component reference signal, a green component reference signal, and a blue component reference signal, and the first optical signal includes a first red component signal, a first green component signal, and a first blue component signal, and wherein calculating the calibration factor for the dry reagent pad at the second read position further includes calculating a red component signal calibration factor, a green component signal calibration factor, and a blue component signal calibration factor based on a ratio of the red, green, and blue component reference signals to the first red, green, and blue component signals.

The method may further comprise: (f) positioning a reagent pad having a volume of sample deposited thereon at the first read position; (g) capturing a second optical signal by the imager, the second optical signal indicative of a reflectance value of the reagent pad at the first read position; (h) positioning the reagent pad at the second read position; (i) capturing a third optical signal by the imager, the third optical signal indicative of a reflectance value of the reagent pad at the second read position; and (j) determining, by the processor, a position-corrected reflectance value of the reagent pad at the second read position by applying the calibration factor to the third optical signal.

The method may further comprise determining a color change value for the reagent pad at the second read position based on a difference between the reflectance value of the second optical signal and the position-corrected reflectance value of the reagent pad at the second read position.

The may further comprise: (k) calculating a corrected wet reflectance value of the second optical signal by applying a wet calibration factor indicative of a change in a reflectance value between a dry reagent pad at the first position and a wet negative reagent pad at the first position; and (l) determining a color change value for the reagent pad at the second read position based on a difference between the corrected wet reflectance value of the second optical signal and the position-corrected reflectance value of the reagent pad at the second read position.

The reagent pad may be positioned at the second read position a predetermined period of time after the volume of sample is deposited on the reagent pad, and in some embodiments the second optical signal includes a second red component signal, a second green component signal, and a second blue component signal, and the third optical signal includes a third red component signal, a third green component signal, and a third blue component signal, and wherein determining the position-corrected reflectance value of the reagent pad at the second read position further includes calculating a red component signal position-corrected value, a green component signal position-corrected value, and a blue component signal position corrected value.

In another aspect, the inventive concepts disclosed herein are directed to a method comprising: (a) advancing a reagent pad through a plurality of read positions in a field of view of an optical imager; (b) detecting by the optical imager optical signals indicative of a reflectance value of the reagent pad at the plurality of read positions; (c) designating, by a processor executing processor executable code, at least one of the plurality of read positions as a reference position; (d) calculating, by the processor, a set of position-correction factors for at least one of the plurality of read positions other than the reference position by using the optical signal detected at the at least one of the plurality of read positions other than the reference position and the optical signal detected at the reference position; and (e) storing, by the processor, the set of position-correction factors for the at least one of the plurality of read positions other than the reference position in a non-transitory computer medium.

The optical signals indicative of the reflectance value of the reagent pad at each of the plurality of read positions may include a red component signal, a green component signal, and a blue component signal, and wherein the processor calculates a red position-correction factor, a green position-correction factor, and a blue position-correction factor for the at least one of the plurality of read positions other than the reference position by comparing the red, green, and blue component signals detected at the at least one of the plurality of read positions other than the reference position with the red, green, and blue component signals detected at the reference position. The processor may store the red, green, and blue position-correction factors for the at least one of the plurality of read positions other than the reference position as a data table. The reagent pad may be advanced through the plurality of read positions sequentially.

The reagent pad may also be advanced through the plurality of read positions starting from the reference position and moving through the at least one of the plurality of read positions other than the reference position. The reagent pad can be positioned on a multiple-profile reagent card, and the card can be automatically advanced through the field of view of the imager. The method may further comprise: (f) detecting a first raw optical signal indicative of a reflectance value of the reagent pad and a volume of sample deposited thereon at the reference position; (g) positioning the reagent pad at the at least one of the plurality of read positions other than the reference position; (h) detecting a second raw optical signal indicative of a reflectance value of the reagent pad and the sample at the at least one of the plurality of read positions other than the reference position; and (i) determining, by the processor, a position-corrected second raw optical signal for the reagent pad and the sample at the at least one of the plurality of read positions other than the reference position by applying the position-correction factor for the at least one of the plurality of read positions other than the reference position to the second raw optical signal to derive a position-corrected second raw optical signal. The method may further comprising calculating a color change value for the reagent pad and the sample at the at least one of the plurality of read positions other than the reference position by comparing the position-corrected second raw optical signal and the first raw optical signal. In some embodiments, the reagent pad can be positioned at the at least one of the plurality of read positions other than the reference position a predetermined period of time after the volume of sample is deposited on the reagent pad.

In a further aspect, the inventive concepts disclosed herein are directed to a reagent analyzer, comprising: (a) an imaging system having a field of view and configured to capture a first image indicative of a reflectance value of a dry reagent pad positioned at a first read position in the field of view, capture a second image indicative of a reflectance value of the dry reagent pad positioned at a second read position in the field of view, and to transmit the first and second image, the first and second images having regions with pixel values depicting the dry reagent pad; and (b) a processor receiving the first and second images, the processor determining a positional calibration factor for the second read position based on differences in pixel values of regions within the first and second image depicting the reagent pad.

The processor may determine a first red component signal, a first green component signal, and a first blue component signal of the first signal, and a second red component signal, a second green component signal, and a second blue component signal of the second signal, and to determine a red, green, and blue component positional calibration factors for the second read position.

BRIEF DESCRIPTION OF THE DRAWINGS

To assist those of ordinary skill in the relevant art in making and using the inventive concepts disclosed herein, reference is made to the appended drawings and schematics, which are not intended to be drawn to scale, and in which like reference numerals are intended to refer to the same or similar elements for consistency. For purposes of clarity, not every component may be labeled in every drawing. Certain features and certain views of the figures may be shown exaggerated and not to scale or in schematic in the interest of clarity and conciseness. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts disclosed herein may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein "dry pad," "dry reagent pad," or "dry test strip" refer to a reagent pad or a row of reagent pads which does not have a volume of sample deposited thereon, or that does not have a sufficient amount of sample deposited thereon to react with the reagent. For example, a dry reagent pad can be the unreacted reagent pad prior to dispensing a volume of sample thereon.

As used herein "wet pad," or "wet reagent pad" refer to a reagent pad that has a volume of sample deposited thereon such that the reagent in the reagent pad may react with its target constituent if such constituent is present in the sample. A wet reagent pad may also have a volume of a negative control deposited thereon.

Finally, as used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

The inventive concepts disclosed herein are generally directed to analyzers for reagent cards, and more particularly, but not by way of limitation, to a method for calibrating reagent analyzers designed to analyze a wet reagent pad using a dry reagent pad to calibrate differences between instruments and reagent lots. While the inventive concepts disclosed herein will be described primarily in connection with automatic analyzers using multiple-profile reagent cards, the inventive concepts disclosed herein are not limited to automatic analyzers or to multiple-profile reagent cards. For example, a method according to the inventive concepts disclosed herein may be implemented with a manual analyzer, or may be implemented with an automatic analyzer using a dip-and-read reagent test device, or a reel of reagent test substrate, and combinations thereof, as will be appreciated by a person of ordinary skill in the art having the benefit of the instant disclosure. Further, the inventive concepts disclosed herein may be implemented with any reagent pad imaging system which has a field of view with two or more read positions in the field of view that are illuminated with different intensities by an illumination source. In some exemplary embodiments, the initial dry reagent pad can be read prior to dispensing a sample on the reagent pad and used to calibrate readings of the reagent pad after the sample has been applied. This can be accomplished by correlating all of the subsequent measurements of the reagent pad to the initial reading of the dry reagent pad. This correlation is described herein as an optional offset value between a wet reagent pad and a dry reagent pad to scale the values to a single reference value. The correlation can be stored in a memory or device, such as an RFID tag, that can be read and/or rewritten by a controller of the analyzer to allow the optional offset value to change or be adjusted in case the offset value would change from one reagent lot to another reagent lot.

In particular, the reflectance value of the reagent pad changes when the reagent pad gets wet. For a negative solution, the change in value is known (or can be measured) and therefore may become the optional offset value. Any change outside of the offset value is likely caused by a reaction with a clinical component that is being measured.

Figure 1:
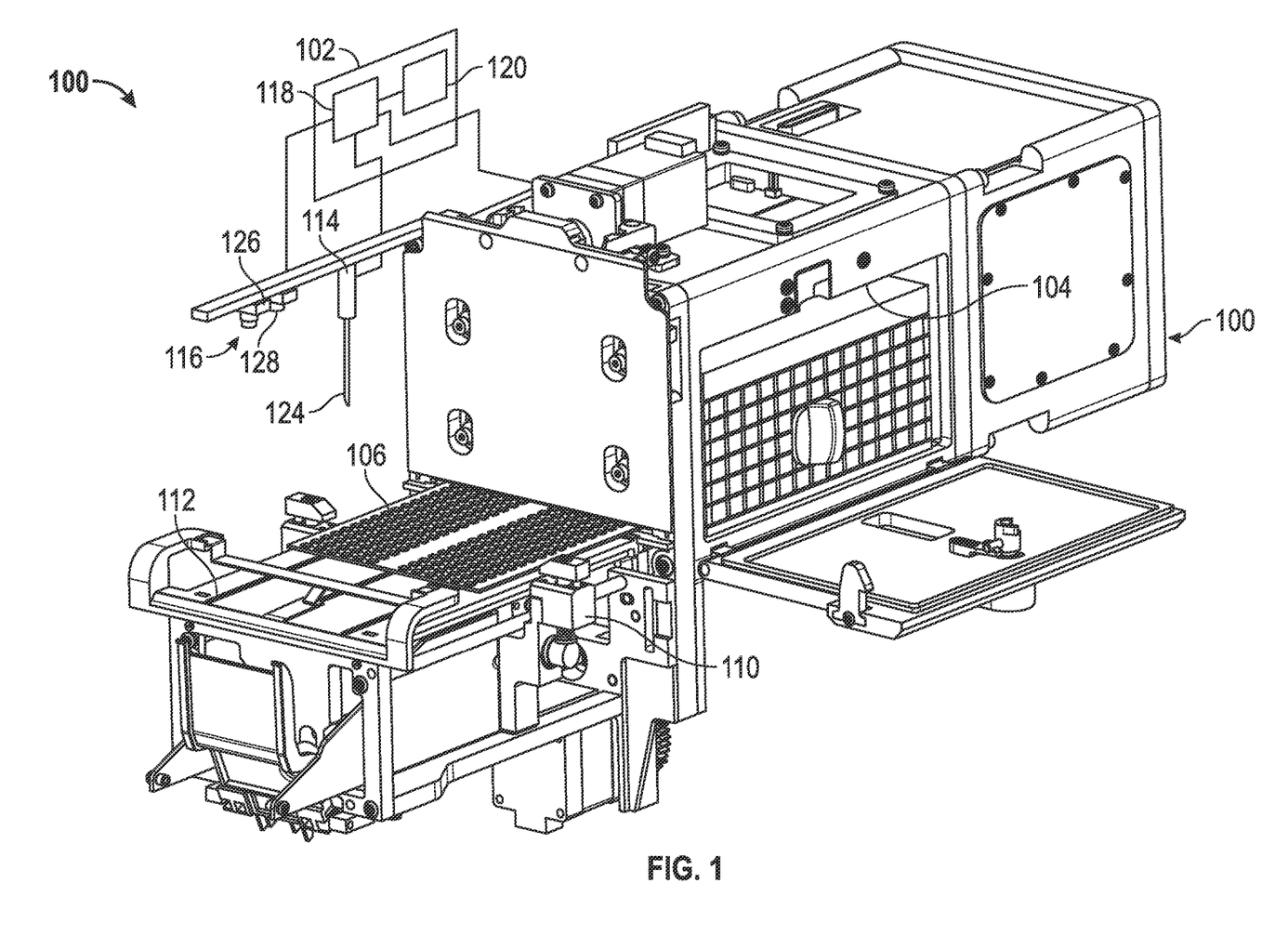
FIG. 1 is a perspective view of an exemplary embodiment of a reagent analyzer according to the inventive concepts disclosed herein, showing a reagent card positioned in a field of view of an imaging system thereof.
Figure 2:
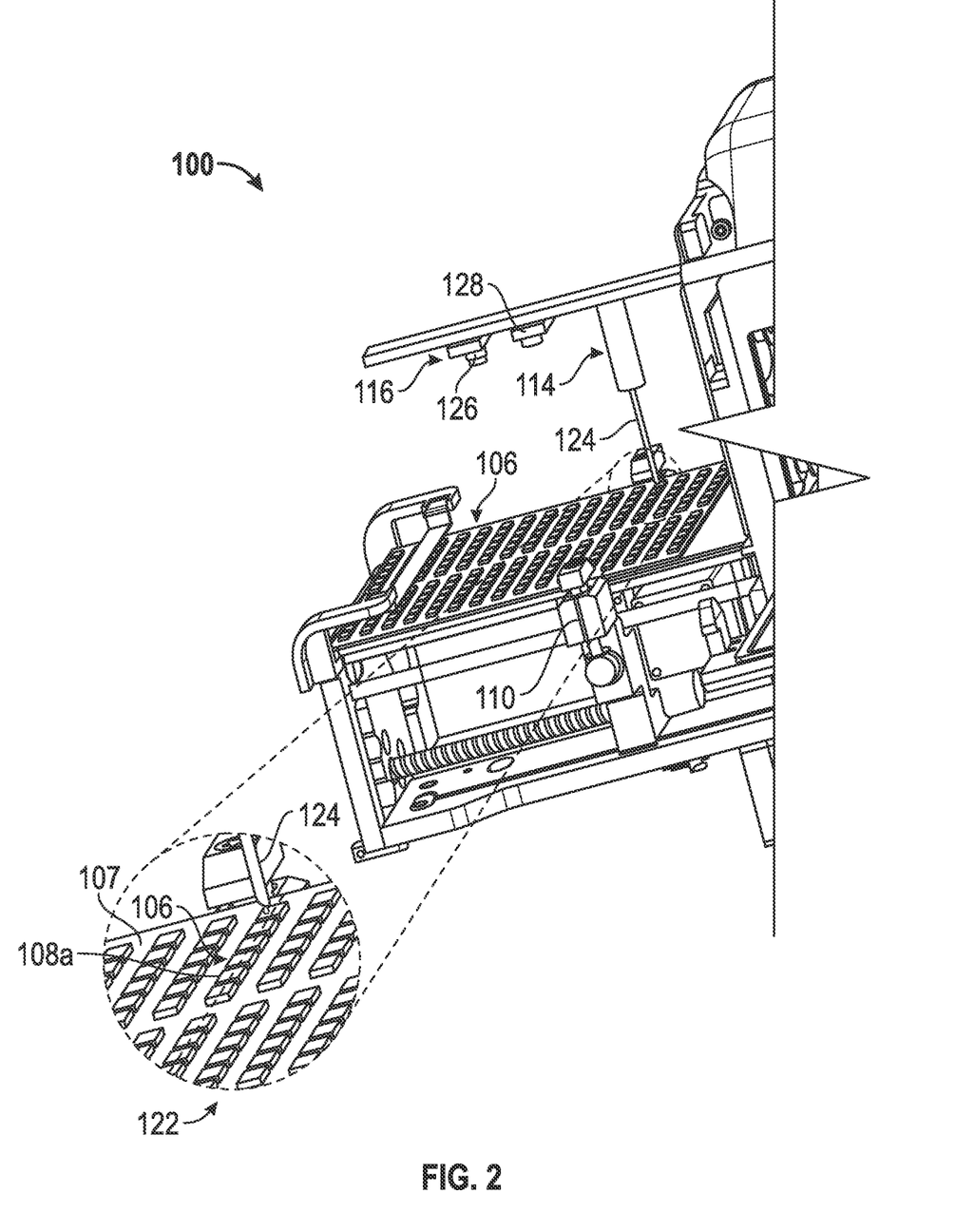
FIG. 2 is a partial perspective view of the analyzer of FIG. 1.

Referring now to FIGS. 1-2, shown therein is an exemplary embodiment of a reagent analyzer 100 according to the inventive concepts disclosed herein. The reagent analyzer 100 may be an automatic reagent card analyzer, for example. Exemplary embodiments of automatic reagent card analyzers are described in detail in U.S. patent application Ser. No. 13/712,144, filed on Dec. 12, 2012, and in PCT application No. PCT/US2012/069621, filed on Dec. 14, 2012, the entire disclosures of which are hereby expressly incorporated herein by reference.

Generally, the reagent analyzer 100 may include a controller 102, a storage compartment 104 configured to hold one or more reagent cards 106 having a plurality of reagent pads 108a-n, a card moving assembly 110, a travel surface 112, a sample delivery assembly 114, and an imaging system 116. The reagent analyzer 100 may also include an optional waste ramp assembly and a waste receptacle (not shown), for example for disposing of reagent cards 106 after the reagent cards 106 have been read by the imaging system 116. An optional external housing (not shown) may be implemented to house and protect the various components of the reagent analyzer 100, and to protect technicians and laboratory work surfaces from contamination, for example.

The controller 102 may include a processor 118 operably coupled with a non-transitory computer-readable medium 120. The controller 102 may be operably coupled with the card moving assembly 110, the sample delivery assembly 114, and the imaging system 116, for example.

The processor 118 may be implemented as a single processor or multiple processors working together or independently to execute processor executable code implementing the logic described herein to calibrate the reagent analyzer 100 as will be described below. Embodiments of the processor 118 may include a digital signal processor (DSP), a central processing unit (CPU), a microprocessor, a multi-core processor, an application specific integrated circuit, a field programmable gate array, and combinations thereof, for example.

The non-transitory computer readable medium 120 can be implemented as RAM, ROM, flash memory or the like, and may take the form of a magnetic device, optical device, or any other device configured to store processor executable instructions and information in a non-transitory manner, for example. The non-transitory computer readable medium 120 can be a single non-transitory computer readable medium, or multiple non-transitory computer readable mediums functioning logically together or independently, for example. The processor executable code can be stored in the non-transitory computer readable medium 120, read by the processor 118, and executed by the processor 118 to perform the logic described herein to calibrate the reagent analyzer 100 as will be described below.

The storage compartment 104 may be configured to accept a reagent card cassette (not referenced) having one or more multiple-profile reagent cards therein, for example.

Each reagent card 106 may include a substrate 107 and one or more, or a plurality of reagent pads 108a-n positioned thereon, or otherwise associated therewith.

The substrate 107 may be constructed of any suitable material, such as paper, photographic paper, polymers, fibrous materials, and combinations thereof, for example.

The reagent pads 108a-n may be arranged in a grid-like configuration on the substrate 107 so as to define one or more test strip 122, for example. In an exemplary embodiment, the reagent pads 108a-n may include fluidic or microfluidic compartments (not shown). The reagent pads 108a-n may be spaced apart a distance from one another so that the test strips 122 are spaced apart such that adjacent test strips 122 and/or reagent pads 108a-n may be simultaneously positioned at separate read positions within the field of view of the imaging system 116, for example. The reagent card 106 may be a multiple-profile reagent card having multiple reagent pads 108a-n having different reagents and/or multiple different test strips 122. Further, in some exemplary embodiments, the reagent card 106 may include one or more calibration chips or reference pads, which may have no reagent and may serve as color references, for example.

Each reagent pad 108a-n may include a reagent configured to undergo a color change in response to the presence of a target constituent such as a molecule, cell, or substance in a sample of a specimen deposited on the reagent pad 108a-n. The reagent pads 108a-n may be provided with different reagents for detecting the presence of different target constituents. Different reagents may cause one or more color change in response to the presence of a certain constituent in the sample, such as a certain type of analyte. The color developed by a reaction of a particular constituent with a particular reagent may define a characteristic discrete spectrum for absorption and/or reflectance of light for that particular constituent. The extent of color change of the reagent and the sample may depend on the amount of the target constituent present in the sample, for example.

The sample may be any body fluid, tissue, or any other chemical or biological sample, and combinations thereof, such as urine, saliva, or blood, for example. The sample may be in liquid form and may contain one or more target constituents such as bilirubin, ketones, glucose, or any other desired target constituent, for example. The presence and concentrations of these target constituents in the sample may be determinable by an analysis of the color changes undergone by the one or more reagent pads 108a-n at predetermined times after application of the sample to the reagent pads 108a-n and/or at predetermined read positions in the field of view of the imaging system 116, for example. This analysis may involve a color comparison of each reagent pad 108a-n to itself at different time periods after application of the sample and/or at different read positions in the field of view of the imaging system 116. In one exemplary embodiment a first read position may be selected as a reference position, and a second read position at which the reagent pad 108a-n is positioned after a predetermined period of time may be selected as a result position, and the test result may be determined from the color change between the reference position and the result position. In this way, the reagent card 106 may assist in diagnosing the existence of diseases and other health problems by allowing the reagent analyzer 100 to make a qualitative and/or a quantitative or semi-quantitative measurement of a target constituent in a sample.

The card moving assembly 110 may be configured to remove a reagent card 106 from the storage compartment 104 (e.g., from a cassette or from a stack of reagent cards 106), and advance the reagent card 106 over the travel surface 112 so that the reagent pads 108a-n and the test strips 122 are positioned on the travel surface 112 and in the field of view of the imaging system 116. The card moving assembly 110 may be implemented as a conveyor belt, a ratchet mechanism, a sliding ramp, or a card-gripping or pulling mechanism, for example, configured to advance a reagent card 106 over the travel surface 112. In some exemplary embodiments, the card moving assembly 110 may be operably coupled with the controller 102 and configured to move a reagent card 106 across the travel surface 112 (e.g., in an intermittent and stepwise manner) with a predetermined speed and delay time between each move so that each reagent pad 108a-n and/or each test strip 122 can be positioned at two or more read positions across a field of view of the imaging system 116 at known intervals of time, for example.

The travel surface 112 may be configured to allow a reagent card 106 to travel thereon, such as by being moved by the card moving assembly 110, for example. In one embodiment, the travel surface 112 is generally planar so as to not distort the shape of the reagent card 106.

The sample delivery assembly 114 may be supported at a known location above the travel surface 112 and may be configured to deliver a volume of sample onto one or more of the reagent pads 108a-n as they are positioned at a known dispensing position. In some exemplary embodiments, the sample delivery assembly 114 may include an automatic pipette 124, which may be moved in two or three-dimensions so as to deposit or otherwise place a volume of sample on each reagent pad 108a-n or a test strip 122, for example. The dispensing position can be within the field of view of the imaging system 116 and also be a read position. The sample delivery assembly 114 may be operably coupled with the controller 102 such that the processor 118 controls the operation of the sample delivery assembly 114, for example.

The imaging system 116 may include an imager 126 and an illumination source 128, which may be fixed relative to the travel surface 112, for example.

The imager 126 may be implemented and function as any desired reader, and may be supported at a location above the travel surface 112 or other suitable location), so that a field of view of the imager 126 includes substantially the entire travel surface 112, for example. In another embodiment, the imaging system 116 may include a mirror over the travel surface 112, to direct light to the imager 126 that is located beside the travel surface 112, for example. The imager 126 may be configured to detect or capture an image or an optical signal indicative of a reflectance value or a color value of a reagent pad 108a-n positioned at each of at least two or a plurality of read positions in the field of view of the imager 126, for example. It is to be understood, however that in some exemplary embodiments, the field of view of the imager 126 may include only a portion of the travel surface 112. The imager 126 may include any desired digital or analog imager, such as a digital camera, an analog camera, a CMOS imager, a diode, and combinations thereof. The imager 126 may also include a lens system, optical filters, collimators, diffusers, or any other optical-signal processing devices, for example. Further, the imager 126 is not limited to an optical imager in the visible spectrum, and may include a microwave imaging system, an X-ray imaging system, and other desired imaging systems, for example. Non-exclusive examples of the imager 126 include optical imaging systems, spectrophotometers, gas chromatographs, microscopes, infrared sensors, and combinations thereof, for example.

The illumination source 128 may be implemented as one or more of a light emitting diode, a light bulb, a laser, an incandescent bulb or tube, a fluorescent light bulb or tube, a halogen light bulb or tube, or any other desired light source or object configured to emit an optical signal having any desired intensity, wavelength, frequency, or direction of propagation, for example. The illumination source 128 may be oriented such that substantially the entire field of view of the imager 126 is illuminated by the illumination source 128. In some exemplary embodiments, the illumination source 128 may be operably coupled with the controller 102 so that control and/or power signals may be supplied to the illumination source 128 by the controller 102. The optical signals emitted by the illumination source 128 may be conditioned or processed by one or more optical or other systems (not shown), such as filters, diffusers, polarizers, lenses, lens systems, collimators, and combinations thereof, for example. Desirably, the intensity of the optical signal emitted by the illumination source 128 is maintained substantially constant through the operation of the reagent analyzer 100, such as by control and power signals supplied by the controller 102.

In some exemplary embodiments more than one illumination source 128 may be implemented, such as a first and a second illuminations source 128, and such first and second illuminations source 128 may have different locations and/or orientations so that the first and second illuminations sources 128 may cooperate to illuminate substantially the entire field of view of the imager 126 (e.g., substantially the entire travel surface 112). The first and second illuminations sources 128 may emit optical signals having different intensities, for example.

In one embodiment, the imaging system 116 may be operably coupled with the processor 118 so that one or more power and/or control signals may be transmitted to the imager 126 and/or to the illumination source 128 by the controller 102, and so that one or more signals may be transmitted from the imager 126 to the processor 118, for example. The controller 102 may be configured to gauge test results as a reagent card 106 is advanced through the reagent analyzer 100 along the travel surface 112, for example, by receiving one or more signals from the imager 126. The imager 126 may be configured to detect or capture one or more optical or other signals indicative of a reflectance value of a reagent pad 108a-n at any desired read position, and to transmit a signal indicative of the reflectance value of the reagent pad 108a-n at each read position to the processor 118, for example. One or more optical signals having wavelengths indicative of a reflectance value of the reagent pads 108a-n and/or the test strip 122 may be detected by the imager 126 at each read position, for example. The imager 126 may detect an optical signal indicative of a reflectance value of a reagent pad 108a-n and/or test strip 122 at any desired read position, location, or area along the travel surface 112, or any other desired location or area or multiple locations or areas, for example. The signal transmitted to the processor 118 by the imager 126 may be an electrical signal, an optical signal, and combinations thereof, for example. In one embodiment, the signal is in the form of an image file having a matrix of pixels, with each pixel having a color code indicative of its reflectance value. In an exemplary embodiment, the image file may have two or more predetermined regions of pixels, each predetermined region of pixels corresponding to a read position of one of the reagent pads 108a-n and/or the test strip 122 in the field of view of the imager 126.

The processor 118 may determine the reflectance value or the color change of reagent pad 108a-n and/or a test strip 122 along with a sample (e.g., urine) disposed on the reagent pad 108a-n and/or test strips 122 based on the signals detected by the imager 126, for example. Each optical or other signal indicative of one or more reflectance value readings detected by the imager 126 may have a magnitude relating to a different wavelength of light (i.e. color). The color of the sample(s) and/or the reaction of the one or more reagents with a target constituent in a reagent pad 108a-n may be determined based upon the relative magnitudes of the reflectance signals of various color components, for example, red, green, and blue reflectance component signals. For example, the color of each reagent pad 108a-n may be translated into a standard color model, which typically includes three or four values or color components (e.g., RGB color model, including hue, saturation, and lightness (HLS) and hue, saturation, and value (HSV) representation of points and/or CMYK color model, or any other suitable color model) whose combination represents a particular color. In some embodiments the imager 126 may detect multiple optical signals at each read position, with each detected signal having one or more color components, such as a red component signal, a green component signal, and a blue component signal, for example, and each of the component signals may be transmitted to the processor 118 via the same or separate communication link, such as a data bus. In some exemplary embodiments, the imager 126 may detect a single optical signal at each read position, and the processor 118 may translate a signal received from the imager 126 into separate color component signals such as a red component signal, a green component signal, and a blue component signal, for example.

Based upon an analysis of a magnitude of the optical signal detected by the imager 126, the processor 118 may assign the sample to one of a number of categories, e.g., a first category corresponding to no target constituent present in the sample, a second category corresponding to a small concentration of target constituent present in the sample, a third category corresponding to a medium concentration of target constituent present in the sample, and a fourth category corresponding to a large concentration of target constituent present in the sample, for example.

Further, the imager 126 may detect an optical signal indicative of a color or a reflectance value of a reagent pad 108a-n and/or a test strip 122 at any time interval after a volume of sample has been dispensed on the reagent pad 108a-n and/or test strip 122, and regardless of the particular read position of the reagent pad 108a-n and/or test strip 122, for example. In one exemplary embodiment, a video, or a sequence of images may be captured of the reagent pad 108a-n and/or test strip 122 at a variety of time intervals after a volume of sample is deposited on the reagent pad 108a-n and/or test strip 122 as the reagent card 106 is advanced between two or more read positions along the travel surface 112.

In operation, the reagent analyzer 100 may generally operate as follows. The card moving assembly 110 advances a reagent card 106 from the storage compartment 104 and into the field of view of the imager 126 of the imaging system 116. The card moving assembly 110 desirably advances the reagent card 106 on the travel surface 112 such that each of the test strips 122 may be positioned at known read positions along the travel surface 112 and through the field of view of the imager 126. Such positioning of the test strips 122 at known read positions may be achieved by moving the reagent card 106 in a gradual manner, in a continuous manner, or in a stepwise manner, and combinations thereof, by the card moving assembly 110, for example. Further, the card moving assembly 110 may move the reagent card 106 between each step and/or each read position at known time intervals, such that the time it took a reagent pad 108a-n to advance to each of the read positions is known. When a reagent pad 108a-n or a first test strip 122 is positioned under the pipette 124 of the sample delivery assembly 114, the pipette 124 may deposit a volume of sample onto one or more of the reagent pads 108a-n and/or the test strip 122.

Next, the card moving assembly 110 advances the reagent card 106 along the travel surface 112 as described above. As subsequent test strips 122 are positioned under the pipette 124, the pipette 124 may dispense a volume of sample onto the one or more reagent pads 108a-n as described above.

The imaging system 116 may be operated intermittently, continuously, or periodically, to detect one or more reflectance signals indicative of the color or the reflectance value of the one or more reagent pads 108a-n at any time and at any desired read position in the field of view of the imager 126, for example. In some exemplary embodiments, the imaging system 116 may capture an image indicative of the color or the reflectance value of the reagent pad 108a-n prior to any sample being deposited onto the reagent pad 108a-n by the pipette 124, or at any known time after a volume of sample has been deposited onto the reagent pad 108a-n by the pipette 124, for example.

Signals indicative of the color of the reagent pads 108a-n may be transmitted by the imaging system 116 to the controller 102, so that the controller 102 may analyze the signals and determine a change in the color of the reagent pad 108a-n as a result of the reagent pad 108a-n reacting with the volume of sample deposited thereon. Such color change may be analyzed as a function of the read position of the reagent pad 108a-n when the optical signal or image indicative of the color of the reagent pad 108a-n was detected, as a function of the known duration of time the volume of sample has been deposited onto the reagent pad 108a-n, and combinations thereof, for example. The color change may be interpreted by the processor 118 as a quantitative, qualitative, and/or semi-qualitative indication of the presence and/or concentration or amount of a target constituent in the volume of sample deposited on the reagent pad 108a-n as described above.

Figure 3:
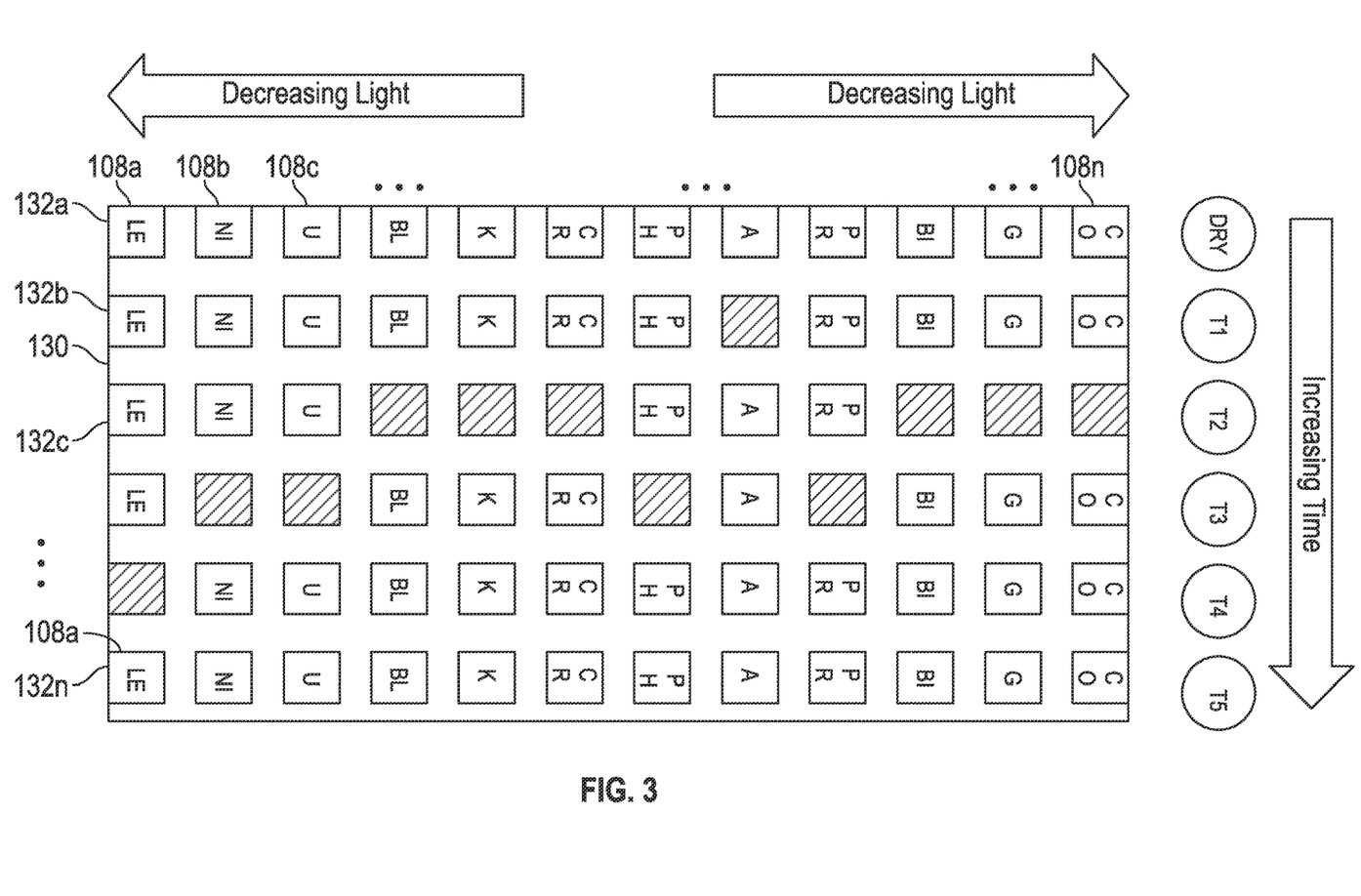
FIG. 3 is a diagram showing positional variation in illumination intensity across a field of view of an imaging system according to the inventive concepts disclosed herein.
Figure 4:
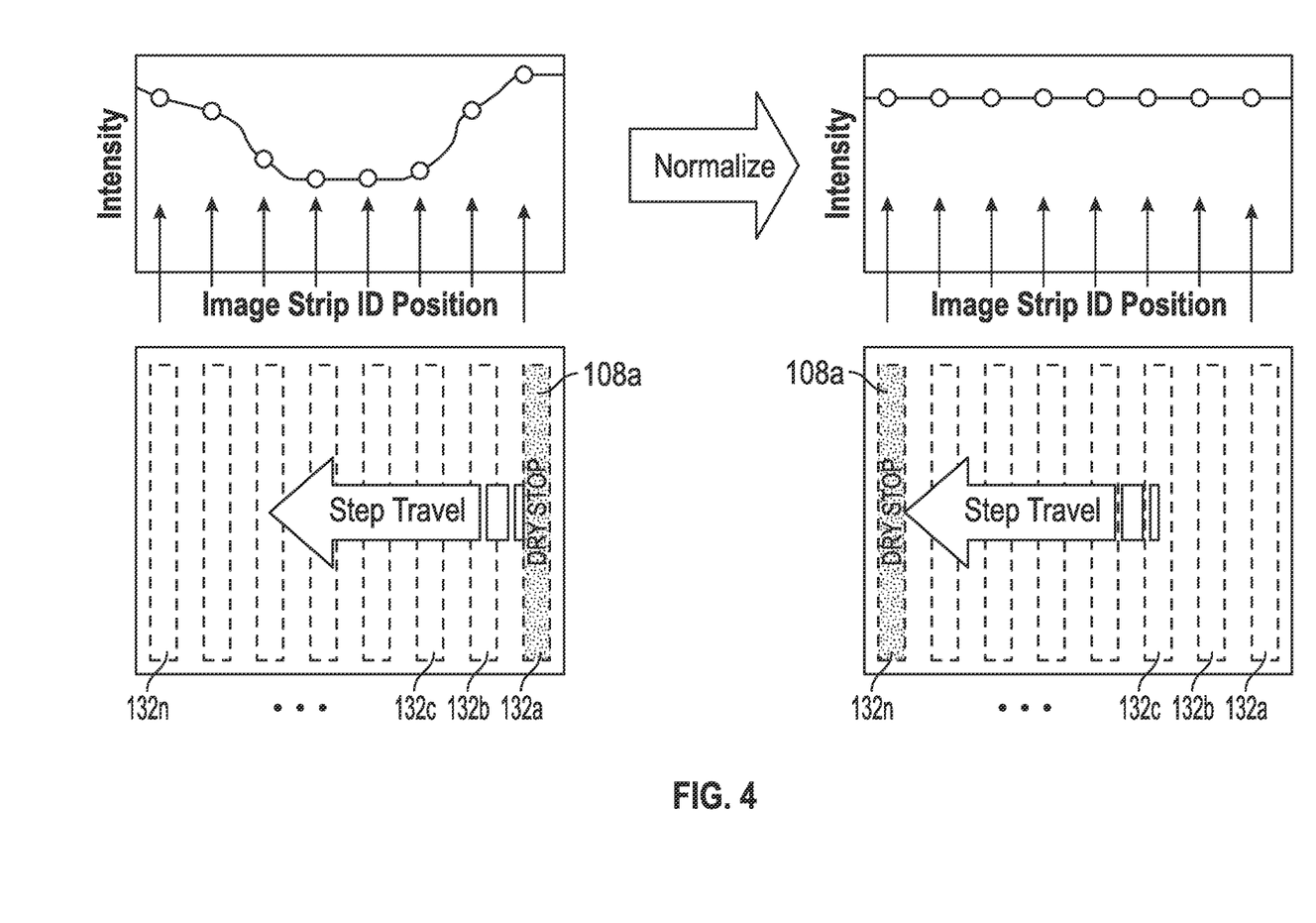
FIG. 4 is a diagram showing a positional calibration method according to the inventive concepts disclosed herein.

Referring now to FIGS. 3-4, the illumination intensity across the field of view 130 of the imager 126 may vary, which may result in inaccurate readings of the color changes of the reagent pads 108a-n as the reagent pads 108a-n are illuminated with a varying intensity at each read position 132a-n. The most intense light (measured as higher RGB) is in a center of the field of view 130, with less intense light as one moves away from the center of the field of view 130. In the example presented in FIG. 3, the reagent card 106 is generally moving through the field of view 130 with increasing time. The field of view 130 has a first border and a second border. The initial reading of a given reagent pad 108a-n is adjacent to the first border and with increasing time this same reagent pad 108a-n moves through the field of view 130 toward the second border. As shown in FIG. 3, the reagent pads 108a-n may be dry at read position 132a, and may receive a volume of sample at the read position 132a. As the reagent pads 108a-n are moved through read positions 132b-n, the time it takes the reagent pads 108a-n to move between each of the read positions 132a-n is known (e.g., shown as T1-T5 in FIG. 3).

Figure 5:
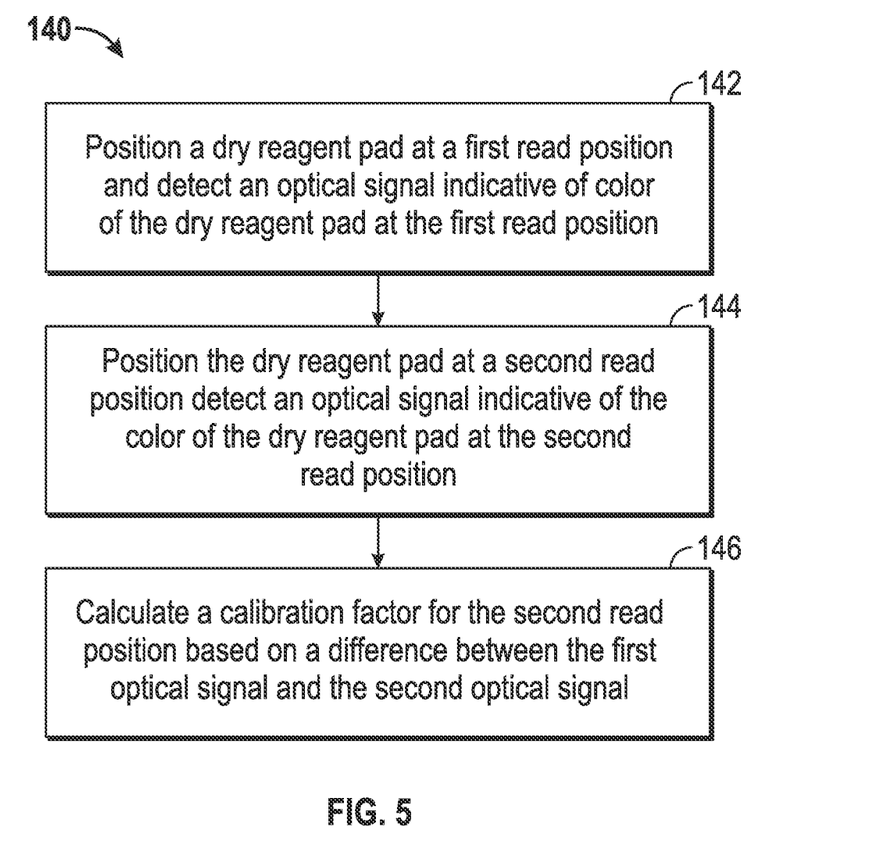
FIG. 5 is a diagram showing the steps of an exemplary embodiment of a positional calibration method according to the inventive concepts disclosed herein.

However, because the level or intensity of illumination is non-uniform across the field of view 130 of the imager 126, different read positions 132a-n receive different illumination levels or intensities. Such non-uniform illumination causes positional differences in the reflectance of each reagent pad 108a-n, and should be accounted for to ensure accurate determination of the color of each reagent pad 108a-n at each read position 132a-n. To that end, a calibration routine 140 as shown in FIGS. 4 and 5, may be carried out by the reagent analyzer 100 as follows:

In a step 142, a dry reagent pad 108a may be positioned at a first read position 132a. The imager 126 may detect a first optical signal or an image indicative of the reflectance value of the reagent pad 108a positioned at the first read position 132a. In an exemplary embodiment, the imager 126 may detect an image having a region of pixels having color or reflectance values depicting the color of the reagent pad 108a positioned at the first read position 132a, and transmit such image to the controller 102.

In a step 144, the dry reagent pad 108a may be moved or stepped to a second read position 132b, and the imager 126 may detect a second optical signal indicative of the reflectance value of the dry reagent pad 108a at the second read position 132b. The imager 126 may detect an image having a region of pixels having color or reflectance values depicting the color of the reagent pad 108a positioned at the second read position 132b, and transmit such image to the controller 102. This step may be repeated several times so that optical signals or images having regions with pixel values indicative of the reflectance values of the dry reagent pad 108a are detected for each read position 132a-n. Because the dry reagent pad 108a does not have a sample deposited thereon, a reaction is not occurring, and the color of the reagent pad 108a remains the same at the first and second read positions 132a and 132b. Thus, differences in the reflectance values detected at the first and second read positions 132a and 132b are due to the non-uniform illumination. Further, this step may be repeated several times such that two or more optical signals or images having regions with pixel values indicative of the reflectance value of the dry reagent pad 108a-n are detected for each read position 132a-n and are averaged to determine an average reflectance value of each dry reagent pad 108a-n for each read position 132a-n. Signals or images having regions of pixels indicative of the reflectance value of each dry reagent pad 108a-n at each read position 132a-n may be transmitted to the processor 118 of the controller 102, for example.

In a step 146, the processor 118 may calculate calibration factor for each reagent pad 108a-n at each read position 132a-n by selecting or otherwise designating a read position 132a-n as a reference read position and referencing each of the remaining read positions 132a-n to the reference read position based on a ratio of the reflectance values of the optical signal or image detected at the reference position to the respective optical signals or images detected at each read position 132a-n by the imager 126. In the example shown in FIG. 3, read position 132n is selected as the reference read position, and calibration factors for all of the reagent pads 108a-n at each of the remaining read positions 132a-n are determined accordingly. It is to be understood, however, that any desired read position 132a-n may be selected as the reference read position. Further, in some exemplary embodiments, rather than selecting a reference read position, each read position 132a-m may be referenced to an ideal color or to a color standard for each reagent pad 108a-n, as will be appreciated by persons of ordinary skill in the art.

The calibration routine 140 may be implemented as a set of processor executable instructions or logic stored in the non-transitory computer readable medium 120, which instructions or logic when executed by the processor 118, cause the processor 118 to carry out the logic to calculate or determine the calibration factors as described above. The calibration routine 140 may be carried out periodically, such as at a preset intervals of time, with each new lot of reagent cards 106, as desired according to specific quality control procedures applicable to the reagent analyzer 100, and combinations thereof, for example.

Further, as will be appreciated by persons of ordinary skill in the art, the calibration routine 140 may be carried out on one or more dry test strips 122 on a reagent card 106 as the remaining test strips 122 are used to test a sample as described above to reduce the downtime for the reagent analyzer 100, for example. A measurement of a reflectance value of a reagent pad 108a-n, or a test strip 122 may be taken by the imaging system 116 before dispensing a volume of sample on the reagent pad 108a-n or the test strip 122, for example.

It is to be understood that the steps disclosed herein may be performed simultaneously or in any desired order. For example, one or more of the steps disclosed herein may be omitted, one or more steps may be further divided in one or more sub-steps, and two or more steps or sub-steps may be combined in a single step, for example. Further, in some exemplary embodiments, one or more steps may be repeated one or more times, whether such repetition is carried out sequentially or interspersed by other steps or sub-steps. Additionally, one or more other steps or sub-steps may be carried out before, after, or between the steps disclosed herein, for example.

The calibration factors determined by the calibration routine 140 may be stored in the non-transitory computer readable medium 120 as a positional look-up data table corresponding to each read location 132a-n, or in any desired format, for example. The calibration factors may be stored in the positional look-up table as a single calibration factor for each reagent pad 108a-n at each read position 132a-n, or as calibration factors for each channel of a desired color model. For example, a red component calibration factor, a green component calibration factor, and a blue component calibration factor may be stored for each reagent pad 108a-n at each read position 132a-n and for each channel of a RGB color model, or any other desired color model.

In the exemplary embodiment shown in FIG. 3, a data table corresponding to each of the reagent pads 108a-n (e.g., 12), positioned at each of the read positions (e.g., 9) would include calibration factors for each of the 96 total read positions. Three or more calibration factors for each of the 96 read positions may be used and may be stored in the data table in some exemplary embodiments. The number of calibration factors may depend on the number of color components used for the color model.

Positional calibration during sample analysis by the reagent analyzer 100 may be accomplished by accessing the calibration factors in the positional look-up table corresponding to the respective reagent pad 108a-n at the particular read position 132a-n in the field of view 130. In one exemplary embodiment, the table may include calibration factors which reduce the variation of RGB readings at different read positions 132a-n in the field of view 130 of the imager 126. In this instance, three calibration factors for the three captured measurements of a reagent pad 108a-n at a read position 132a-n, corresponding to the color components RED, GREEN, and BLUE may be used at each of the corresponding read positions 132a-n. A reference read position (or row of positions in the case of a test strip 122) may be selected, which reference read position may have, by definition, a value of 1. Other read positions or rows of read positions could also be used as a reference. Desirably, the read position 132a-n with the least variation across several calibration routines 140 would be chosen as the reference position, as will be appreciated by persons of ordinary skill in the art.

In one exemplary embodiment, the positional correction factors may be computed from the region of interest (e.g., a region of pixels with pixel values indicative of the reflectance values of the dry reagent pad 108a-n) averages recorded from a dry reagent pad 108a-n or a dry test strip 122 that is marched through the field of view 130 during a wet calibration of the reagent analyzer 100 according to the following equation:

$$PCOR r,i,c = AvgRGB r,1,c / AvgRGB r,i,c$$

where "r" is the index of the reagent pad 108a-n; "i" is the index of the read position; "c" is the index of the color (red, green, blue); and "1" is the index of the reference read position for reagent r. The pixel values within the region of interest may be averaged to reduce noise within the measurement and thereby obtain a better value for an entire reagent pad. If one or more correction factors are outside a predetermined limit, a calibration error may be posted and the new set of calibration data may be discarded. In the current preferred method of using positional correction, a 6-point running average is used to calculate the correction factors for each read position in the positional correction table. If one or more values is more than 0.0800 (i.e., 8.00%) outside the current average value, a calibration error is posted and the new data are discarded. This preferred procedure is to assure good positional constants are obtained and to minimize the potential of spurious points.

Field of view positional calibration may then be carried out by the processor 118 through the use of a ratio equation for each read position (i,j) within the field of view 130 as described below:

$$PC(i,j) = RAW(i,j) * PCOR(i,j)$$

where PC represents the positional corrected value, RAW the raw measured RGB value, and POOR the correction factor for a given reagent pad 108a-n and read position 132a-n.

As described above, the differences in illumination at the different read positions 132a-n can be calibrated by using a single dry reagent pad 108a-n measurement at each of the read positions 132a-n.

In some exemplary embodiments, the initial dry reagent pad 108a-n reading can also be used to effectively calibrate differences caused by reagent lot and reagent analyzer 100, as follows.

The preferred method of calibrating instrument-to-instrument and lot-to-lot differences between reagent analyzers 100 and reagent lots, which may be stored as processor executable instructions in the non-transitory computer readable medium 120, is given by the following equation:

$$Decode = 1000*(1+((Rgt.rgb.dry-Rgt.rgb.wet-CO.neg.Rgt.rgb.wet)/(Rgt.rgb.dry-CO.neg.Rgt.rgb.wet))),$$

where: Decode represents the final corrected value scaled such that 1000 is the expected value for a negative sample;

Rgt.rgb.dry represents a measurement of a dry reagent pad 108a-n at the particular read position within the set of read positions 132a-n;

Rgt.rgb.wet represents a measurement of a particular reactant (wet) reagent pad 108a-n at the particular read position within the set of read positions 132a-n;

CO.neg.Rgt.rgb.wet represents an optional offset value between a wet negative reagent pad and a dry reagent pad to scale the values to a single reference value for a negative (in this case 1000). This offset value may be different for each analyzer 100 and stored in the non-transitory computer readable medium 120 and may be adjusted for each reagent lot if needed, for example.

As will be appreciated by a person of ordinary skill in the art, the RGB value of a reagent pad 108a-n changes when a volume sample is deposited on the pad 108a-n. When such change in RGB value is known for a given negative reagent pad 108a-n at the initial read position 132a-n, instrument and reagent lot differences may be calibrated by using the change in the RGB value between the dry reagent pad 108a-n and the negative wet reagent pad 108a-n at the initial read position as the CO.neg.Rgt.rgb.wet offset value in the above equation. The CO.neg.Rgt.rgb.wet offset value may allow all of the measurements of a wet reagent pad 108a-n to be ratioed to the measurement of the initial dry reagent pad 108a-n, so that any variations in the analyzer 100, and any reagent lot-to-lot variations are calibrated to further optimize the accuracy of the analyzer 100.

As will be appreciated by persons of ordinary skill in the art having the benefit of the instant disclosure, any other desired equation or formula may be used to calculate the position correction factor for each read position, provided such formula or equation takes into the account the correction factors for each read position as described above, for example.

It is to be understood that while the inventive concepts disclosed herein are described in connection with detecting a reflectance value of reagent pads, in some exemplary embodiments of the instant inventive concept, an absorbance value, a transmittance value, or any other value or property relating to a color or a color change of a reagent pad may be used to calculate positional calibration factors.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and as defined in the appended claims.

What is claimed is:

1. A method for calibrating an imager of a reagent analyzer, comprising:

positioning a dry reagent pad mounted on a substrate of a reagent card at a first read position in a field of view of the imager by actuating a card moving assembly by a processor, the first read position illuminated by an illumination source with a first intensity, the dry reagent pad extending from the substrate;

detecting, by the imager, a first reflectance value of the dry reagent pad at the first read position;

positioning the dry reagent pad at a second read position in the field of view of the imager by actuating the card moving assembly by the processor, the second read position illuminated with a second intensity different from the first intensity due to non-uniform lighting by the illumination source, the dry reagent pad being a reagent pad which does not have a volume of sample deposited thereon, or that does not have a sufficient amount of sample deposited thereon to react with the reagent at either the first read position or the second read position;

detecting, by the imager, a second reflectance value of the dry reagent pad at the second read position;

receiving the first reflectance value of the dry reagent pad at the first read position, and the second reflectance value of the dry reagent pad at the second read position, by the processor configured to receive the first reflectance value and the second reflectance value;

calculating a calibration factor, by the processor configured to calculate the calibration factor for the dry reagent pad at the second read position, based on a difference between the first reflectance value and the second reflectance value; and storing the calibration factor for the dry reagent pad at the second read position in a non-transitory computer readable medium as a component of a data table storing multiple sets of calibration factors, with each set for a particular read position.

2. The method of claim 1, wherein the calibration factor for the dry reagent pad at the second read position is calculated based on a ratio of the first reflectance value to the second reflectance value.

3. The method of claim 1, further comprising designating the calibration factor as 1 for the first read position.

4. The method of claim 1, wherein the first reflectance value includes a red component reference signal, a green component reference signal, and a blue component reference signal, and the second reflectance value includes a first red component signal, a first green component signal, and a first blue component signal, and wherein calculating the calibration factor for the dry reagent pad at the second read position further includes calculating a red component signal calibration factor, a green component signal calibration factor, and a blue component signal calibration factor based on a ratio of the red, green, and blue component reference signals to the first red, green, and blue component signals.

5. The method of claim 1, further comprising:
positioning a wet reagent pad having a volume of sample deposited thereon at the first read position;
capturing a second optical signal by the imager, the second optical signal indicative of a reflectance value of the wet reagent pad at the first read position;
positioning the wet reagent pad at the second read position;
capturing a third optical signal by the imager, the third optical signal indicative of a reflectance value of the wet reagent pad at the second read position; and
determining, by the processor, a position-corrected reflectance value of the wet reagent pad at the second read position by applying the calibration factor to the third optical signal.

6. The method of claim 5, further comprising determining a color change value for the wet reagent pad at the second read position based on a difference between the reflectance value of the second optical signal and the position-corrected reflectance value of the wet reagent pad at the second read position.

7. The method of claim 5, further comprising:
calculating a corrected wet reflectance value of the second optical signal by applying a wet calibration factor indicative of a change in a reflectance value between a dry reagent pad at the first read position and a wet negative reagent pad at the first read position; and
determining a color change value for the reagent pad at the second read position based on a difference between the corrected wet reflectance value of the second optical signal and the position-corrected reflectance value of the reagent pad at the second read position.

8. The method of claim 6, wherein the wet reagent pad is positioned at the second read position a predetermined period of time after the volume of sample is deposited on the wet reagent pad.

9. The method of claim 5, wherein the second optical signal includes a second red component signal, a second green component signal, and a second blue component signal, and the third optical signal includes a third red component signal, a third green component signal, and a third blue component signal, and wherein determining the position-corrected reflectance value of the wet reagent pad at the second read position further includes calculating a red component signal position-corrected value, a green component signal position-corrected value, and a blue component signal position corrected value.

10. A method comprising:
advancing a dry reagent pad mounted on a substrate of a reagent card through a plurality of read positions in a field of view of an optical imager actuating a card moving assembly by a processor, the dry reagent pad extending from the substrate;
detecting, by the optical imager, a first reflectance value of the dry reagent pad at a first read position of the plurality of read positions, and a second reflectance value of the dry reagent pad at a second read position of the plurality of read positions, the first read position illuminated with a first intensity, and the second read position illuminated with a second intensity different from the first intensity due to non-uniform light by an illumination source;
calculating a set of position-correction factors, by the processor configured to receive the first reflectance value and the second reflectance value, and calculate the set of position-correction factors for the second reference position by using a difference between the first reflectance value and the second reflectance value, the dry reagent pad not having a volume of sample deposited thereon at the first read position and the second read position of the plurality of read positions; and
storing the set of position-correction factors, by the processor configured to store the set of position-correction factors for the second reference position in a non-transitory computer readable medium.

11. The method of claim 10, wherein the first reflectance value of the dry reagent pad at the first read position and the second reflectance value of the dry reagent pad at the second read position include a red component signal, a green component signal, and a blue component signal, and wherein the processor is configured to calculate a red position-correction factor, a green position-correction factor, and a blue position-correction factor for second read position by comparing the red, green, and blue component signals detected at the second read position with the red, green, and blue component signals detected at the first read position.

12. The method of claim 11, wherein the processor stores the red, green, and blue position-correction factors for the second read position as a data table.

13. The method of claim 11, wherein the dry reagent pad is advanced through the plurality of read positions sequentially.

14. The method of claim 13, wherein the dry reagent pad is advanced through the plurality of read positions starting from the first read position and moving through the at least one of the plurality of read positions other than the first read position.

15. The method of claim 14, wherein the reagent card is a multiple-profile reagent card, and wherein the reagent card is automatically advanced through the field of view of the imager.

16. The method of claim 10, further comprising:
positioning a wet reagent pad at the second read position;
detecting a third reflectance value of the wet reagent pad and the sample at the second read position; and
determining a position-corrected raw optical signal, by the processor configured to determine the position-corrected raw optical signal for the wet reagent pad and the sample at the second read position by applying the set of position-correction factors for the second read position to the third reflectance value to derive the position-corrected raw optical signal.

17. The method of claim 16, further comprising detecting a fourth reflectance value by the imager of the wet reagent pad at the first read position, and calculating a color change value for the wet reagent pad and the sample at the second read position by comparing the position-corrected raw optical signal and the fourth reflectance value.

18. The method of claim 17, wherein the wet reagent pad is positioned at the second read position a predetermined period of time after the volume of sample is deposited on the wet reagent pad.

* * * * *

UNITED STATES PATENT AND TRADEMARK OFFICE
CERTIFICATE OF CORRECTION

Page 1 of 1

PATENT NO. : 11,035,799 B2
APPLICATION NO. : 14/383160
DATED : June 15, 2021
INVENTOR(S) : Chris Thomas Zimmerle, Amy Zercher and Jennifer Ann Goldsburg It is certified that error appears in the above-identified patent and that said Letters Patent is hereby corrected as shown below:

On the Title Page

In item (71), please delete "Applicants: Chris Thomas Zimmerle, Goshen, IN (US); Amy Zercher, Nappanee, IN (US); Jennifer Ann Goldsburg, Vandalia, MI (US)"
And replace with Applicant: Siemens Healthcare Diagnostics Inc.

Signed and Sealed this
Fourteenth Day of March, 2023

Katherine Kelly Vidal
*Director of the United States Patent and Trademark Office*